H. J. DAVIES.
Clock-Frame or Case.

No. 159,160. Patented Jan. 26, 1875.

UNITED STATES PATENT OFFICE.

HENRY J. DAVIES, OF BROOKLYN, NEW YORK.

IMPROVEMENT IN CLOCK FRAMES OR CASES.

Specification forming part of Letters Patent No. 159,160, dated January 26, 1875; application filed November 25, 1874.

*To all whom it may concern:*

Be it known that I, HENRY J. DAVIES, of Brooklyn, in the county of Kings and State of New York, have invented an Improvement in Clocks, of which the following is a specification:

This invention relates to frames or standards for skeleton and other clocks having the pendulum exposed to view, suitable for mantel-pieces and elsewhere, and has for its object the production of a clock which, while cheap, has a very effective and ornamental appearance.

This invention consists of a clock-frame or standard composed of angular portions or frames, constructed to receive mirrors or other ornamental surfaces, said frame or standard rising from a suitable base, and supporting upon its upper ends a back, which serves as a base for the clock-works.

Figure 1:
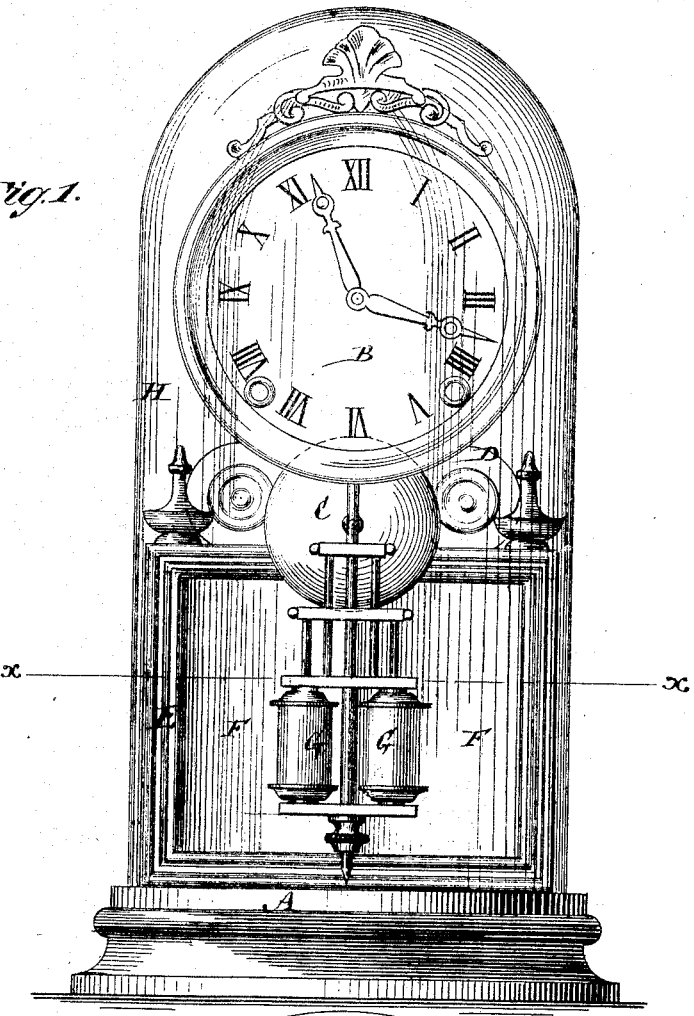
Figure 2:
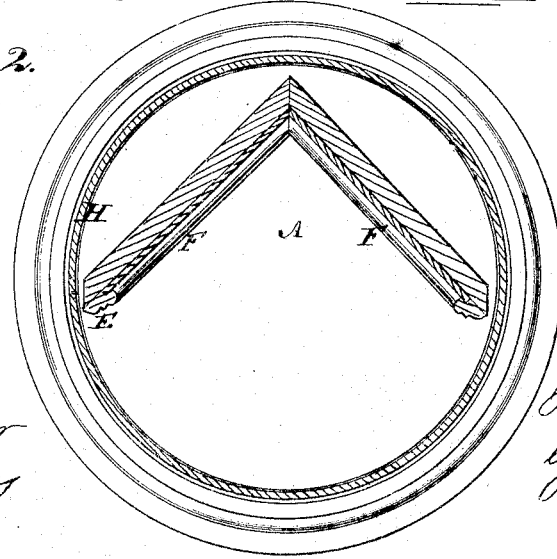

Figure 1 represents a front view of a clock constructed in accordance with my invention; and Fig. 2, a horizontal section on the line $x$ $x$, omitting the clock-work.

A is the base of the clock-frame; D, its back; B, its dial, and C a bell for striking the hours. The back or portion D of the clock-frame is composed in part of or mounted on an angular mirror-frame, E, which rests on or is attached to the base A, and serves to carry the back D. The angular mirror-frame E has two or more mirrors, F F, or other ornamental surfaces, immediately in rear of the pendulum G, and disposed in such angular relation with each other and with the pendulum, which vibrates within or in front of them, that when the clock is viewed from its front the reflection of the pendulum is multiplied or repeated three or more times by reason of the diverging arrangement of the mirror or mirrors as a whole in a front or forwardly direction, the two or more mirrors virtually forming but a single one, and the entire clock, with its pendulum and mirror or mirrors, preferably being incased by a glass shade, H, to protect the whole, mirrors included, from dust and injury.

It will be seen that the angular frame is arranged between the clock-works and the base or bottom of the clock-frame, and thereby supports the clock-work frame, and that it is constructed to receive and confine in place the reflectors or mirrors; and that the front portion of the clock-frame is left open, whereby the pendulum is exposed to view, and its movements reflected.

I claim—

The clock-frame or standard composed of the angular portions or frames E E, adapted to receive mirrors or other ornamental surfaces, and the portion D supported thereon, and serving as a base for the clock-works, all substantially as herein set forth.

HENRY J. DAVIES.

Witnesses:
MICHAEL RYAN,
HENRY T. BROWN.